United States Patent [19]

Moore et al.

[11] Patent Number: 6,026,003
[45] Date of Patent: Feb. 15, 2000

[54] CHARGE PUMP CIRCUIT AND METHOD FOR GENERATING A BIAS VOLTAGE

[75] Inventors: Jeremy W. Moore; James S. Caravella, both of Chandler; Thomas P. Bushey, Apache Junction, all of Ariz.

[73] Assignee: Motorola, Inc., Schaumburg, Ill.

[21] Appl. No.: 09/215,932

[22] Filed: Dec. 18, 1998

[51] Int. Cl.[7] .............................. H02M 3/18; G05F 1/10; G05F 3/02
[52] U.S. Cl. .............................. 363/60; 307/110; 327/536
[58] Field of Search ........................ 363/59, 60; 307/110, 307/109; 327/536

[56] References Cited

U.S. PATENT DOCUMENTS

| | | | |
|---|---|---|---|
| 4,559,548 | 12/1985 | Iizuka et al. | 357/23.6 |
| 5,394,365 | 2/1995 | Tsukikawa | 365/189.09 |
| 5,625,544 | 4/1997 | Kowshik et al. | 363/60 |
| 5,633,825 | 5/1997 | Sakuta et al. | 365/189.09 |
| 5,790,393 | 8/1998 | Fotouhi | 363/60 |
| 5,801,934 | 9/1998 | Lacey et al. | 363/60 |
| 5,828,095 | 10/1998 | Merritt | 257/299 |

OTHER PUBLICATIONS

K. Sawada et al., "An On–Chip High–Voltage Generator Circuit for EEPROMs with a Power Supply Voltage below 2V", 1995 Symposium on VLSI Circuits Digest Technical Papers, pp. 75–76.

P. Favrat et al., "An Improved Voltage Doubler in a Standard CMOS Technology", 1997 IEEE International Symposium on Circuits and Systems, Jun. 9–12, 1997, Hong Kong, pp. 249–252.

*Primary Examiner*—Peter S. Wong
*Assistant Examiner*—Bao Q. Vu
*Attorney, Agent, or Firm*—Anthony M. Martinez; Robert F. Hightower

[57] ABSTRACT

A charge pump (102) and method of charge pumping a low voltage ($V_{DD}$)) to generate a higher voltage ($V_{PP}$). A primary pump (160, 179, 180) receives complementary clock signals (CLK1, CLK2) that control charging and transfer cycles of the charge pump. During the charging cycle, a capacitor (150) stores a charge developed from the low voltage. On the transfer cycle, the charge is transferred to an output (138, 177, 178) through a switching transistor (152) disposed in a well region (202) to develop the higher voltage. A secondary pump (162, 187, 188) charge pumps the output voltage to generate a more positive bias voltage for biasing the well region to disable a parasitic PNP transistor of the switching transistor.

20 Claims, 2 Drawing Sheets

6,026,003

CHARGE PUMP CIRCUIT AND METHOD FOR GENERATING A BIAS VOLTAGE

BACKGROUND OF THE INVENTION

The present invention relates in general to semiconductors, and more particularly to charge pumps.

Integrated circuits are being designed for use in an increasing variety of portable applications. These integrated circuits often must be capable of operating from a battery that supplies less than two volts. However, many integrated circuits require higher voltages to perform circuit functions. For example, nonvolatile memory circuits made with electrically erasable, floating gate transistors are programmed with high voltage signals whose amplitudes can exceed fourteen volts.

The high voltage signals are derived from a high voltage supply generated on chip with a charge pump that pumps the battery voltage to the level of the high voltage supply. However, at low battery voltages prior art charge pumps are inefficient.

Hence, there is a need for an improved charge pump that operates efficiently at low voltages.

DETAILED DESCRIPTION OF THE DRAWINGS

In the figures, elements having the same reference numbers have similar functionality.

Figure 1:
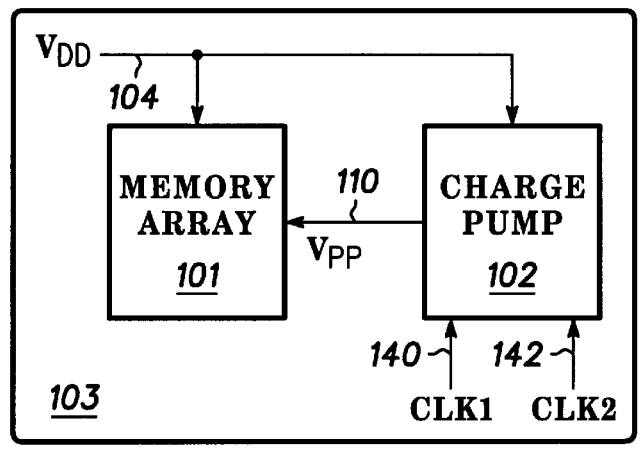
FIG. 1 illustrates a block diagram of a memory circuit in accordance with the present invention.

FIG. 1 illustrates a block diagram of a nonvolatile, electrically programmable memory circuit 100 integrated on a semiconductor die 103 to form an integrated circuit that includes a memory array 101 and a charge pump 102. Memory circuit 100 has a terminal or node 104 for receiving a battery supply voltage $V_{DD}$ that has a typical value of two volts. Memory circuit 100 is suitable for use in portable applications such as cellular telephones, pagers and other devices.

Memory array 101 is implemented with floating gate transistors which store information by retaining electrical charges on their floating gates. The charges are induced by high voltage programming signals applied to control gates of the floating gate devices. Memory array 101 further includes control and programming circuitry for reading and modifying the stored information. The high voltage programming signals are derived from a supply voltage $V_{PP}$ that typically has an amplitude of at least fourteen volts.

Charge pump 102 generates $V_{PP}$ at an output 110 by charge pumping VDD through a series of pump stages as will be described. The pumping is controlled by clock signals CLK1 and CLK2 received at nodes 140 and 142.

Figure 2:
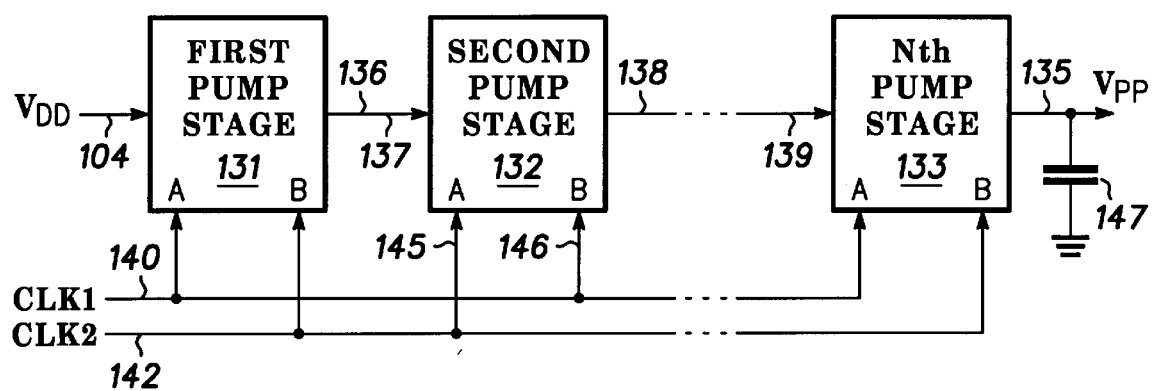
FIG. 2 illustrates a block diagram of a charge pump in accordance with the present invention.

FIG. 2 illustrates a block diagram of charge pump 102 showing N pipelined charge pump stages, including a first pump stage 131, a second pump stage 132, and an Nth pump stage 133, where N is an integer. $V_{DD}$ is received at node 104 and pumped to progressively higher voltages through pump stages 131–133 to develop pump voltage $V_{PP}$ across an output capacitor 147 at node 135. Each of the pump stages 131–133 performs a similar function of charge pumping the output voltage of the previous stage up to a more positive potential.

The voltage increase through each pump stage is approximately equal to the magnitude of $V_{DD}$. That is, pump stage 131 receives $V_{DD}$ at terminal 104 and charge pumps $V_{DD}$ to produce a pump voltage of about $2*V_{DD}$ volts at an output 136. Similarly, pump stage 132 receives $2*V_{DD}$ at an input 137 for charge pumping to a pump voltage of about $3*V_{DD}$ at an output 138, etc.

Each of the pump stages 131–133 operates in two cycles, a charging cycle and a transfer cycle, which are controlled by clock signals CLK1 and CLK2. CLK1 and CLK2 are complementary non-overlapping clock signals whose voltage levels alternate between approximately ground and $V_{DD}$ potential.

Successive pump stages operate on alternate cycles by applying CLK1 and CLK2 to alternate clock inputs of successive stages. That is, pump stage 131 receives CLK1 at an A input to initiate its charging cycle, while pump stage 132 receives CLK1 at a B input to enable its transfer cycle. Similarly, CLK2 is applied to a B input of pump stage 131 to initiate its transfer cycle, and an A input of pump stage 132 to control its charging cycle. CLK1 and CLK2 are non-overlapping to maximize the amount of charge pumped forward through each of the stages 131–133, i.e., from stage 131 to stage 132, etc.

Figure 3:
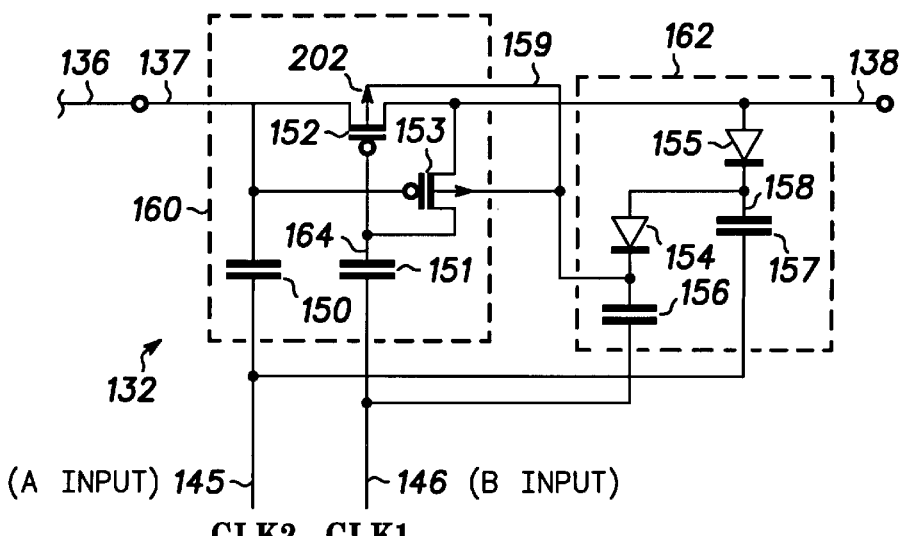
FIG. 3 schematically illustrates a charge pump stage in accordance with the present invention.

FIG. 3 schematically illustrates pump stage 132 in further detail. Pump stages 131 and 133 shown in FIG. 2 have similar or identical configurations. Pump stage 132 has a first input 137 for developing an input voltage from a charge produced by pump stage 131. A primary pump 160 pumps the input voltage up to a more positive level to generate a pump voltage at output 138. Primary pump 160 includes an input capacitor 150, a gate capacitor is 151, and transistors 152 and 153. Input capacitor 150 is used as a level shifting device so that A input 145 and input 137 can operate at different voltage levels, while allowing CLK2 transitions to couple through input capacitor 150 to input 137. Similarly, gate capacitor 151 functions as a level shifter to allow B input 146 and node 164 to operate at different voltage levels while coupling CLK1 transitions to node 164.

Figure 4:
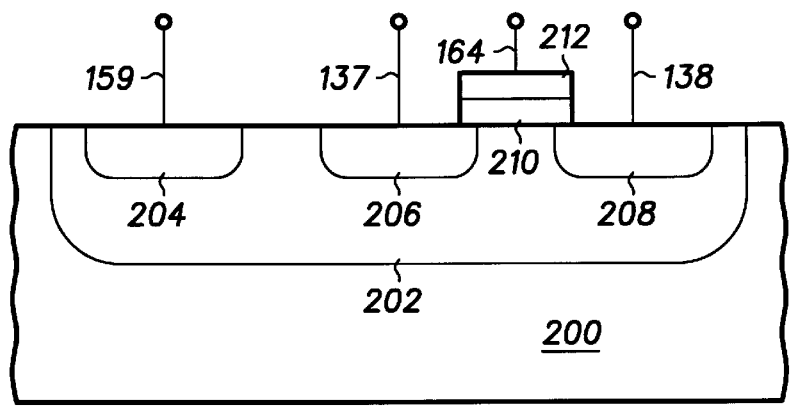
FIG. 4 illustrates a cross-section of a switching transistor disposed on a semiconductor die in accordance with the present invention.

A secondary pump 162 generates a bias voltage at a node 159 for biasing a well region 202 of semiconductor die 103 (see FIG. 4). Switching transistor 152 is formed in well region 202. Secondary pump 162 includes capacitors 156 and 157 and diodes 154 and 155.

The operation of primary pump 160 proceeds as follows. Assume that CLK1 and CLK2 are momentarily low and that node 164 initially is at about the same voltage as output 138. A charging cycle commences on a low to high CLK1 transition, i.e., a transition from approximately ground to approximately VDD potential. Transistor 153 turns on to establish equal voltages on node 164 and output 138 to turn off transistor 152. Pump stage 133 pumps node 138 to the greater of the potentials at input 137 or output 138. Switching transistor 152 turns off to isolate output 138 from input 137, allowing a charge generated by pump stage 131 to flow to input 137 for storing on capacitor 150.

The charging cycle terminates on a high to low CLK1 transition, and a transfer cycle commences on the next low to high transition of CLK2. The CLK1 high to low transition is coupled through capacitor 151 to lower the voltage on node 164, while the CLK2 low to high transition is coupled through input capacitor 150 to raise the voltage on input 137 above the voltage on node 164. Transistor 153 turns off. Switching transistor 152 turns on to transfer the charge stored on input capacitor 150 to output 138 to develop the pump voltage across an input capacitor (not shown) of the next pump stage. The transfer cycle terminates on a high to low transition of CLK2 that turns on transistor 153 to restore equal potentials on output 138 and node 164. Switching transistor 152 is thereby turned off to begin the next charging and transfer cycles.

The use of switching transistor 152 to transfer charge calls for particular care in biasing well region 202 in order to avoid charge being shunted through a parasitic transistor to a node other than output 138, thereby reducing efficiency or even disabling pump stage 132.

Prior art charge pumps bias the well region of the switching transistor to either the source or drain of the switching transistor. Since the maximum potential can occur on either the source or drain electrode, a parasitic transistor turns on during circuit operation to shunt charge to the substrate of the integrated circuit. Hence, the efficiency of prior art charge pumps is degraded.

FIG. 4 illustrates a cross-sectional view of a portion of semiconductor die 103, showing the structure of switching transistor 152 in relation to its associated parasitic PNP transistors. Switching transistor 152 is disposed in well region 202 formed in a semiconductor substrate 200. Substrate 200 is formed from a p-type semiconductor material and typically is biased to ground potential. Well region 202 is an n-type material coupled to node 159 of pump stage 132 through a heavily doped n-type contact region 204.

Switching transistor 152 includes regions 206 and 208 of p-type semiconductor material that function as conduction electrodes, i.e., the drain and source, of switching transistor 152. Region 206 is coupled to input 137 and region 208 is coupled to output 138 of pump stage 132. A gate electrode 212 is formed over a dielectric layer 210 for coupling to node 164. Voltages applied to gate electrode 212 modulate a channel formed under dielectric layer 210 to provide a conduction path between regions 206 and 208.

Hence, switching transistor 152 is implemented as a p-channel metal-oxide-semiconductor (PMOS) field effect transistor that operates in the enhancement mode. Switching transistor 152 is preferably a PMOS device rather than an n-channel metal-oxide-semiconductor (NMOS) device because of a lower body effect, i.e., voltage difference between well region 202 and regions 206 and/or 208, when pumping to more positive voltages. The lower body effect results in a higher switching efficiency. A switching device has a further advantage of simpler gate drive circuitry because there is no need to drive its gate to a voltage higher than the pump voltage in order to switch the device, as is the case with an NMOS device. Moreover, efficient operation of pump stage 132 can be obtained at supply voltages as low as one volt.

A first parasitic PNP transistor has an emitter formed by region 206, a base formed by well region 202, and a collector formed by substrate 200. A second parasitic PNP transistor is formed with region 208 functioning as its emitter, well region 202 as its base, and substrate 200 as its collector. One or both of these parasitic PNP transistors can turn on if region 206 or region 208 becomes forward biased with respect to well region 202. If a parasitic PNP transistor turns on, charge can be shunted from input 137 to substrate 200 instead of being transferred to output 138. Since such shunted charge is not available for pumping up the output voltage, a pump stage can be disabled or can operate at a reduced efficiency. To avoid this problem, well region 202 receives a bias voltage provided at node 159 to maintain a reverse bias on regions 206 and 208 with respect to well region 202.

Referring back to FIG. 3, secondary pump 162 is shown providing the bias voltage to well region 202 at node 159. Secondary pump 162 operates as a charge pump that pumps the output pump voltage on output 138 to a more positive potential to generate the bias voltage. Secondary pump 162 operates with charging and transfer cycles that are opposite to the charging and transfer cycles of primary pump 160. That is, a charging cycle of primary pump 160 coincides with a transfer cycle of secondary pump 162, and vice versa.

Secondary pump 162 uses steering diodes 154 and 155, rather than a switching transistor, to control charge transfers. The use of diodes 154 and 155 has an advantage of reducing the bias voltage by the voltage drop across diodes 154 and 155, which reduces the body effect on switching transistor 152 and improves its switching efficiency. Diodes 154 and 155 have a further advantage in not having associated parasitic transistors that can turn on to shunt charge as described previously.

Capacitor 156 is used as a level shifter to allow input 146 and node 159 to operate at different voltage levels while coupling CLK1 transitions through capacitor 156 to node 159. Similarly, capacitor 157 level shifts input 145 and node 158 while coupling CLK2 transitions from input 145 through capacitor 157 to node 158. Capacitors 156 and 157 preferably have low capacitance values in comparison to capacitor 150. For example, in the embodiment of FIG. 3, capacitors 156 and 157 typically have a capacitance value of 0.5 picofarads while capacitor 150 has a capacitance of twenty picofarads.

A charging cycle of secondary pump 162 commences with a high to low CLK2 transition and a low to high CLK1 transition. The low to high CLK1 transition is coupled through capacitor 156 to increase the voltage on node 159, while the high to low CLK2 transition is coupled through capacitor 157 to reduce the voltage on node 158. Hence, diode 154 becomes reverse biased to isolate node 158 from node 159. Diode 155 becomes forward biased, allowing a charge developed from the pump voltage of output 138 to flow through diode 155 for storing on capacitor 157.

The charging cycle terminates as a transfer cycle begins with a high to low CLK1 transition and a low to high CLK2 transition. The high to low CLK1 transition is coupled through capacitor 156 to reduce the voltage on node 159, while the low to high CLK2 transition is coupled through capacitor 157 to increase the voltage on node 158. Hence, diode 155 is reverse biased to isolate node 158 from output 138. Diode 154 is forward biased to transfer charge from capacitor 157 to capacitor 156, thereby developing the bias voltage at node 159 across capacitor 156.

Secondary pump 162 effectively derives the bias voltage at node 159 from the pump voltage at output 138, thereby ensuring that the bias voltage remains more positive than the pump voltage. As a result, the parasitic PNP transistors remain disabled even when the pump voltage at output 138 varies.

Figure 5:
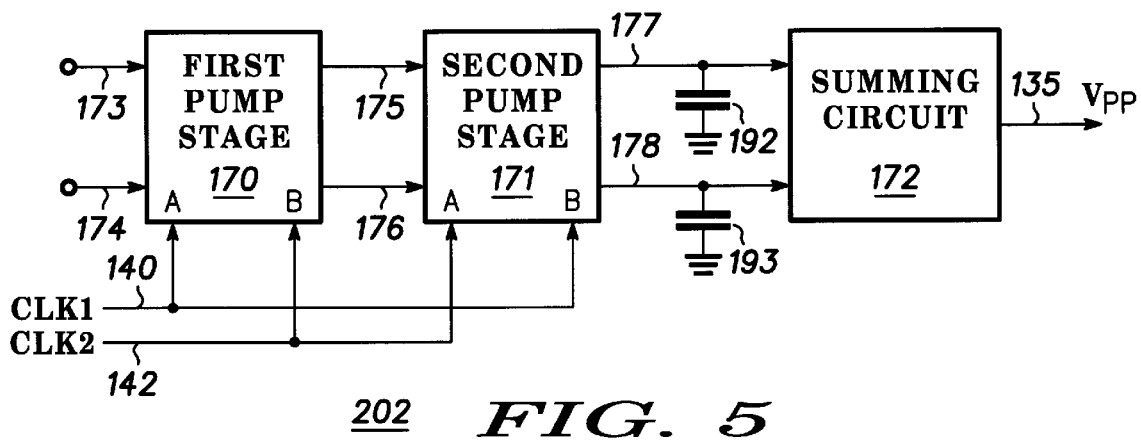
FIG. 5 illustrates an alternate embodiment of a charge pump in accordance with the present invention.

FIG. 5 shows a charge pump 202 that is an alternate embodiment of charge pump 102. Charge pump 202 includes pump stages 170 and 171, and a summing circuit 172. Pump stages 170 and 171 transfer charge through parallel paths. Hence, a first input charge received at input 173 is pumped through pump stages 170 and 171 to node 177 to develop a first pump voltage across capacitor 192. A second input charge received at input 176 is pumped through pump stages 170 and 171 to node 178 to develop a second pump voltage at node 178 across a capacitor 193. The first and second pump voltages typically are equal.

A summing circuit sums the charges respectively stored on capacitors 192 and 193 to produce output pump voltage $V_{PP}$ of charge pump 202. In one embodiment, summing circuit 172 includes conductive paths that couple nodes 177 and 178 to output 135, effectively connecting capacitors 192 and 193 in parallel.

Figure 6:
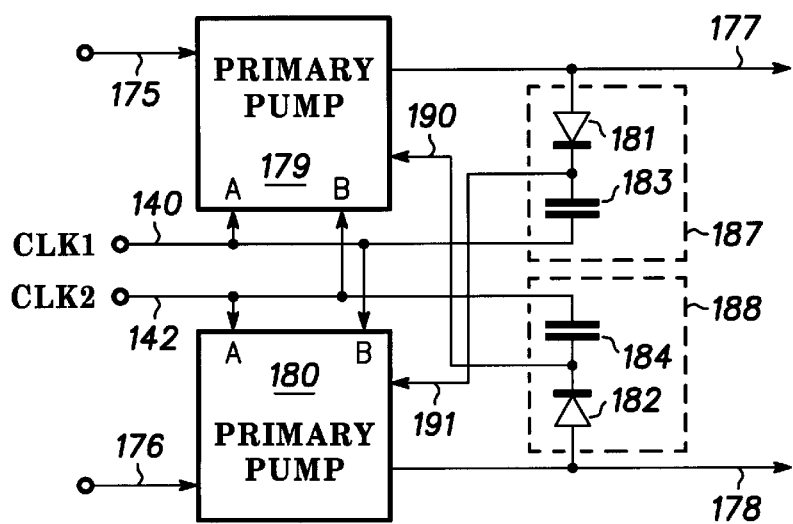
FIG. 6 schematically illustrates a pump stage of the charge pump of FIG. 5 in accordance with the present invention.

FIG. 6 schematically illustrates pump stage 171 in further detail, including primary pumps 179 and 180, and secondary pumps 187 and 188. Primary pumps 179 and 180 have a similar configuration as primary pump 160 shown in FIG. 3. In particular, primary pumps 179 and 180 transfer charge through switching transistors disposed in well regions. The structures of the switching transistors are similar to the structure of switching transistor 152, shown in FIG. 4, so that the switching transistors and well regions of primary pumps 179 and 180 are associated with parasitic PNP transistors. To ensure that the parasitic PNP transistors remain disabled, secondary pump 188 generates a first bias voltage at a node 190 to bias a well region of primary pump 179, and secondary pump 187 generates a second bias voltage at a node 191 to bias a well region of primary pump 180.

Note that CLK1 is received on node 140 and coupled to the A input of primary pump 179 and the B input of primary pump 180. CLK2 is received on node 142 and coupled to the B input of primary pump 179 and the A input of primary pump 180. Hence, charging cycles of primary pump 179 occur during transfer cycles of primary pump 180, and vice versa. Therefore, charge is transferred to output 177 or 178 on each cycle. That is, a first charge is transferred through primary pump 179 to output 177 on one cycle, and a second charge is transferred through primary pump 180 to output 178 on the next cycle. As a result, primary pumps 179 and 180 can develop pump voltages using smaller capacitors without sacrificing the ability to drive load currents. The smaller die area occupied by the smaller capacitors compensates for the area required to implement pump stage 171 with two primary pumps 179 and 180, so there is little or no increase in die size or cost.

The operation of secondary pump 187 proceeds as follows. A low to high CLK1 transition is coupled through capacitor 183 to increase the potential of node 191 above output 177, reverse biasing diode 181 and allowing charge to be transferred from input 175 to output 177 through primary pump 179. A high to low CLK1 transition is coupled through capacitor 183 to reduce the potential of node 191 below output 177, forward biasing diode 181 and allowing a portion of the charge on output 177 to flow to capacitor 183 for storing. The first bias voltage is developed at node 191 with such charges that are stored on capacitor 183.

Secondary pump 188 operates in a similar fashion to generate the second bias voltage at node 190 for the well region of primary pump 179. However, the operation of secondary pump 188 is controlled by CLK2 instead of CLK1.

By now it should be appreciated that the present invention provides an improved charge pump and method of charge pumping a supply voltage to generate a higher supply voltage. A primary pump operates in alternating charging and transfer cycles controlled by complementary clock signals. During the charging cycle, a charge from a previous stage is stored on an input capacitance of the primary pump to develop an input voltage. On the transfer cycle, the charge is transferred to an output through a switching transistor to develop a more positive output voltage. The switching transistor is disposed in a well region formed on a semiconductor substrate. A secondary pump charge pumps the output voltage to generate a more positive bias voltage for the well region. The secondary pump uses steering diodes to transfer charge, and therefore does not have a parasitic PNP transistor that can turn on to shunt charge from the secondary pump. The bias voltage generated by the secondary pump ensures that the potential of the well region remains more positive than the drain and source of the switching transistor to prevent a parasitic PNP transistor from turning on to drain charge from the charge pump.

We claim:

1. An integrated circuit, comprising:
    a well region;
    a first charge pump having an output and a conduction path for transferring a charge through the conduction path to the output to produce a first pump voltage, wherein the conduction path is formed in the well region; and
    a second charge pump having an input for storing the first pump voltage and an output coupled to the well region for providing a second pump voltage.

2. The integrated circuit of claim 1, further comprising a semiconductor substrate, wherein the well region is disposed in the semiconductor substrate.

3. The integrated circuit of claim 2, wherein the first charge pump includes a transistor disposed in the well region, the transistor having a channel for providing the conduction path between an input of the first charge pump and the output of the first charge pump.

4. The integrated circuit of claim 3, wherein the semiconductor substrate has a p-type conductivity, the well region has an n-type conductivity, and the transistor comprises a p-channel metal-oxide-semiconductor field effect transistor.

5. The integrated circuit of claim 3, wherein the first charge pump further includes a pump capacitor coupled between a first input and a clock input of the first charge pump for storing the charge.

6. The integrated circuit of claim 5, wherein the transistor has a control electrode responsive to a clock signal for isolating the first input from the output of the first charge pump during a first state of the clock signal and for transferring the charge to the output during a second state of the clock signal.

7. The integrated circuit of claim 1, wherein the second charge pump includes:
    a first diode having a first electrode coupled to the output of the first charge pump;
    a first capacitor having a first electrode coupled at a node to a second electrode of the first diode for sampling the first pump voltage;
    a second diode coupled between the node and the output of the second charge pump; and
    a second capacitor coupled to the output of the second charge pump for developing the second pump voltage.

8. The integrated circuit of claim 7, wherein the second charge pump has a first clock input coupled to a second electrode of the first capacitor for receiving a first clock signal and has a second clock input coupled to a second electrode of the second capacitor for receiving a second clock signal.

9. The integrated circuit of claim 1, wherein the second charge pump maintains the second pump voltage at a potential that is more positive than a potential of the first pump voltage.

10. The integrated circuit of claim 1, further comprising a memory circuit having a node coupled for receiving the first pump voltage for developing a programming signal to alter data stored in the memory circuit.

11. A method for generating a bias voltage, comprising the steps of:

disposing a conduction path in a well region of an integrated circuit;

pumping a charge through the conduction path to generate a pump voltage; and charge pumping the pump voltage to produce the bias voltage to bias the well region.

12. The method of claim 11, further comprising a step of disposing the well region in a semiconductor substrate.

13. The method of claim 12, wherein the step of pumping a charge includes the step of switching the conduction path of a transistor with a clock signal.

14. The method of claim 13, wherein the step of pumping a charge includes the step of charging a first capacitance to develop the pump voltage.

15. The method of claim 14, wherein the step of pumping a charge includes the steps of:

storing the charge on a second capacitance; and transferring the charge through the conduction path to the first capacitance during a first state of the clock signal.

16. The method of claim 15, wherein the step of storing includes the step of switching off the transistor during a second state of the clock signal to isolate the second capacitance from the first capacitance.

17. The method of claim 11, wherein the step of charge pumping includes the steps of:

charging a first capacitance to the pump voltage during a first state of a clock signal to produce a sampling charge; and transferring the sampling charge to a second capacitance during a second state of the clock signal to develop the bias voltage.

18. The method of claim 17, wherein the step of transferring the sampling charge includes the step of isolating the pump voltage from the first capacitance during the second state of the clock signal.

19. An integrated circuit, comprising:

a well region;

a first charge pump having an input coupled for receiving an input voltage and an output for providing a first pump voltage, wherein the first charge pump includes:

a transistor formed in the well region and having a first conduction electrode coupled to the input of the first charge pump, a second conduction electrode coupled to the output of the first charge pump, and a control electrode coupled for receiving a first clock signal; and a first capacitor having a first electrode coupled to the input of the first charge pump and a second electrode coupled for receiving a second clock signal;

a second charge pump having an input coupled for receiving the first pump voltage and an output for providing a second pump voltage to the well region, wherein the second charge pump includes:

a diode having a first electrode coupled to the output of the first charge pump; and a second capacitor having a first electrode coupled to a second electrode of the diode and a second electrode coupled for receiving the first clock signal.

20. The integrated circuit of claim 19, wherein the first charge pump further includes:

a third capacitor, wherein the control electrode of the transistor is coupled for receiving the first clock signal via the third capacitor; and a second transistor formed in the well region and having a control electrode coupled to the input of the first charge pump, a first conduction electrode coupled to the output of the first charge pump and a second conduction electrode coupled to the control electrode of the transistor.

* * * * *